Patented July 27, 1937

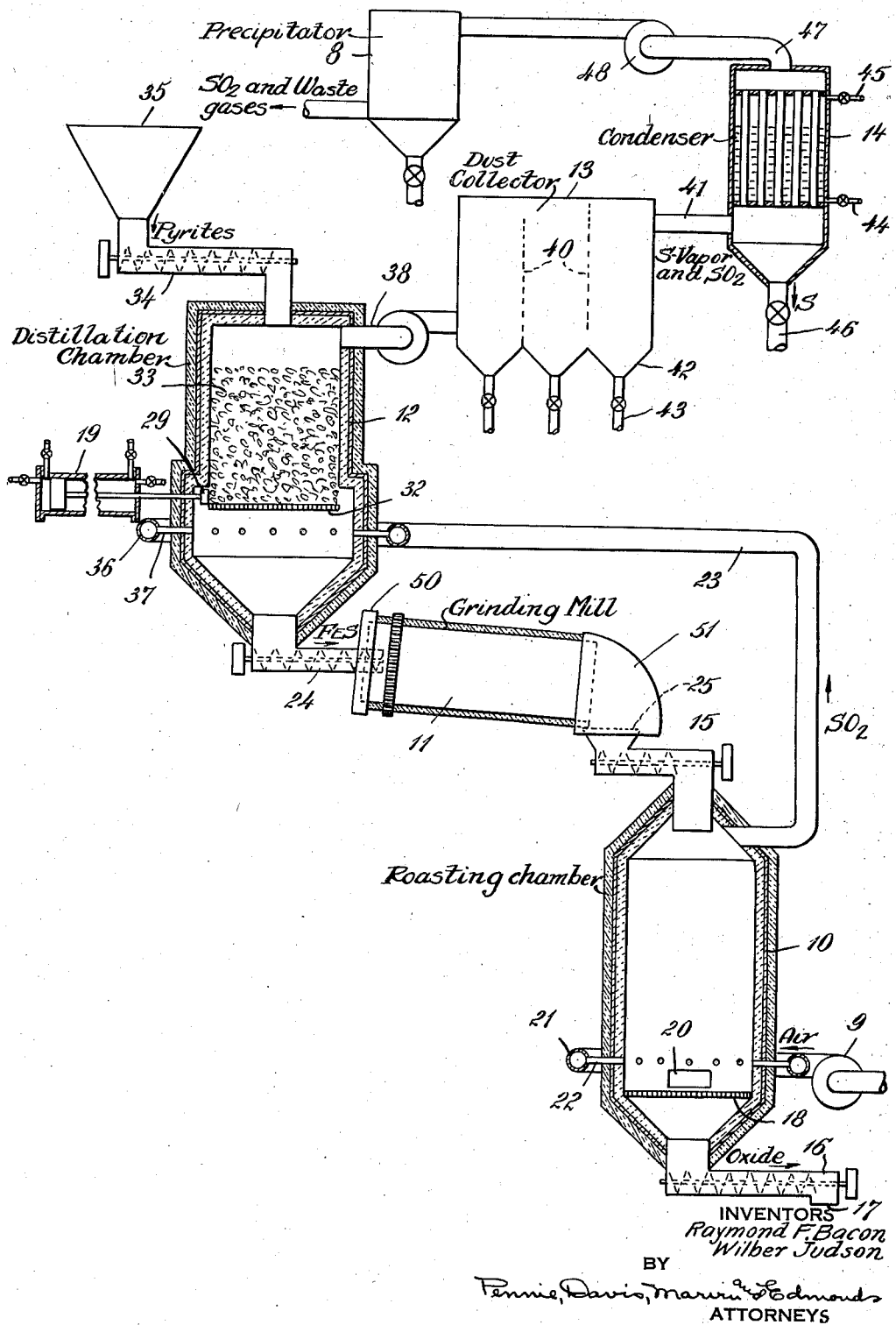

2,087,892

UNITED STATES PATENT OFFICE 2,087,892

RECOVERY OF SULPHUR

Raymond F. Bacon, Bronxville, N. Y., and Wilber Judson, Newgulf, Tex.

Application October 18, 1934, Serial No. 748,951

9 Claims. (Cl. 23—226)

This invention relates to the recovery of sulphur and has for an object the provision of an improved process and apparatus for recovering elemental sulphur from metal sulphide-bearing material. More particularly, the invention contemplates the provision of an improved process and apparatus for recovering elemental sulphur from pyrites.

The present invention contemplates the effective utilization of heat capable of being developed by reactions involved in or associated with the oxidation of pyrites for the recovery of the volatile sulphur of the pyrites in elemental form. The method of the invention involves the oxidation of an iron sulphide product resulting from the distillation of pyrites under such conditions as to produce sufficient heat to effect the distillation of the pyrites.

According to the preferred method of the invention, the iron sulphide residue from a pyrites distillation operation is subjected to a suspension roasting operation to produce iron oxide and a substantially oxygen-free gaseous product containing sulphur dioxide. The roasting operation is so controlled that a gaseous product containing sufficient heat to effectively distill the volatile sulphur of the quantity of pyrites required to produce iron sulphide for the roasting operation is formed. The gaseous product of the roasting operation is passed through a porous bed of granular pyrites to effect the distillation of the volatile sulphur of the pyrites and the production of an iron sulphide product which is subsequently treated in the roasting operation.

The invention will be better understood from a consideration of the following description in conjunction with the accompanying drawing showing schematically apparatus which may be employed in carrying out a process of the invention.

The apparatus shown in the drawing comprises a suspension roasting chamber 10, a grinding mill 11, a distillation chamber 12, a dust collector 13, a condenser 14 and an electrical precipitator 8, all so connected by suitable means that iron sulphide-bearing material may be delivered from the distillation chamber to the roasting chamber in suitable form for suspension roasting and gases from the roasting chamber may be employed progressively in distilling, dust removing, cooling or condensing and precipitating treatments.

The roasting chamber 10 is an upright cylindrical chamber covered with heat insulating material and provided with a heat refractory lining. The upper portion of the roasting chamber communicates with a screw conveyor 15 which is adapted to deliver iron sulphide-bearing material to be roasted from the grinding mill 11. The lower portion of the roasting chamber communicates with a screw conveyor 16 which is adapted to convey solid materials from the roasting chamber to a discharge outlet 17. The screw conveyors 15 and 16 are so constructed and arranged that materials may be delivered to and removed from the roasting chamber without admitting air to the chamber. A grate 18 is disposed within the lower portion of the roasting chamber to collect agglomerations too large for convenient passage through the conveyor 16. A work hole 20 provided with a suitable removable cover permits access to the interior of the roasting chamber for the purpose of removing or breaking agglomerations collected on the grate 18. An annular manifold 21 surrounding the roasting chamber and communicating therewith through tuyères 22 is provided for introducing air from the fan or blower 9 into the roasting chamber. A gas outlet 23 is disposed adjacent the top of the roasting chamber for conducting hot gases from the roasting chamber to the distillation chamber.

The distillation chamber 12 is a rectangular chamber provided with an expanded hopper bottom, lined throughout with heat-refractory material and having a covering of heat-insulating material. A grate 32 capable of supporting a porous bed 33 of pyrites is disposed between the top and bottom of the chamber with two of its opposite ends attached to the walls of the chamber. The other ends of the grate are spaced from the walls of the distillation chamber to provide passages for permitting the discharging of pyrites residue. A hydraulic ram 19 having a rectangular head plate 29 substantially equal in length to the width of the chamber is provided for aiding in discharging pyrites residue from the portion of the chamber above the grate through the passages between the grate and the chamber walls. The upper portion of the distillation chamber communicates with a screw conveyor 34 which is adapted to deliver materials for treatment from a storage hopper 35 to the distillation chamber. The screw conveyor 34 is so constructed and arranged that materials may be delivered to the distillation chamber without admitting air. An annular manifold 36 surrounding the distillation chamber and communicating therewith through tuyères 37 is provided for introducing hot gases from the conduit 23 leading from the roasting chamber into the interior of the reducing and distillation chamber below the grate 32. The lower portion of the distillation chamber communicates with a screw conveyor 24 which delivers material from the bottom of the chamber to the grinding mill 11. The grinding mill may be of any suitable type which will reduce the pyrites residue to particle sizes suitable for suspension roasting (preferably minus 40-mesh). The grinding mill discharges into a hopper 25 feeding into the screw conveyor 15. The feed and discharge ends of the grinding mill are provided with hoods 50 and 51 which prevent contact of the atmosphere with the material delivered to and discharged from the grinding mill.

A conduit 38 provides a passage for conducting gases from the upper portion of the distillation chamber to the interior of the dust collector 13. The dust collector is provided with a series of baffles 40 so arranged as to provide a tortuous path for the flow of gases between the inlet conduit 38 and an outlet 41. The bottom of the dust collector is provided with a number of hoppers 42 for the reception of dust particles removed from the gas stream. The hoppers 42 are provided with valved outlets 43 through which dust particles collected in the hoppers may be withdrawn. The dust collector outlet 41 communicates with the lower portion of the condenser 14.

The condenser 14 is in the form of a fire tube boiler provided with a valved inlet 44 for water and a valved outlet 45 for steam. Condensate formed in the condenser may be withdrawn from the lower portion thereof through a valved outlet 46. Gases may be conducted from the condenser through an outlet conduit 47 having a fan 48 included therein to the electrical precipitator 8 which may be of any suitable construction.

In employing the apparatus illustrated in the drawing for carrying out a method of the invention, pyrites in the form of particles sufficiently large to form a porous bed on the grate 32, is introduced into the upper portion of the distillation chamber 12 from the storage hopper 35 by means of the screw conveyor 34. The pyrites particles on the grate 32 are subjected to the action of an upwardly rising current of hot gases from the roaster introduced into the chamber through the tuyères 37. The particles of pyrites are heated by the gases to a temperature at which distillation of the volatile sulphur of the pyrites is effected. The gaseous product containing the sulphur dioxide produced in the roaster and the volatile sulphur of the pyrites in the form of elemental sulphur vapor and a solid product comprising a residue of the pyrites, substantially in the form of the monosulphide of iron are thus produced.

An alternative method of employing the apparatus of the invention is as follows:

A mixture of pyrites and solid carbonaceous material such, for example, as coke in the form of particles sufficiently large to form a porous bed on the grate 84, is introduced into the upper portion of the reducing and distillation chamber 72 from the storage hopper 87 by means of the screw conveyor 86. The pyrites particles and carbon particles on the grate 84 are subjected to the action of an upwardly rising current of substantially oxygen-free hot gases from the roaster introduced into the chamber through the conduit 83 and the tuyères 37. The particles of carbonaceous material and pyrites are heated by the gases to a temperature at which distillation of the volatile sulphur of the pyrites and reduction of the sulphur dioxide of the gases by means of the carbonaceous material are effected. The gaseous product containing the sulphur of the sulphur dioxide and the volatile sulphur of the pyrites in the form of elemental sulphur vapor and a solid product comprising a residue of the pyrites, substantially in the form of the monosulphide of iron, are thus produced. The gaseous product passes to the dust collector 13 through the outlet conduit 38. Distillation of the volatile sulphur of the relatively large pyrites particles causes the particles to become shattered to some extent, and the resulting iron sulphide product is in a relatively finely divided form. The solid residue from the pyrites passes in part through the grate 32 and in part through the passages between the grate and the chamber walls and is delivered to the screw conveyor 24 which conveys it to the grinding mill 11. The residue is reduced to particles of sizes suitable for suspension roasting and the ground product is conveyed to the roasting chamber by the screw conveyor 15.

The iron sulphide particles are showered into the roasting chamber by the screw conveyor 15 and, in passing downwardly through the roasting chamber, they encounter an upwardly rising current of air introduced into the chamber through the tuyères 22. The oxygen of the air reacts with the iron sulphide to produce gaseous sulphur dioxide and solid iron oxide. The oxidizing operation is preferably so controlled as to produce a substantially oxygen-free gaseous product having a temperature in excess of 1000° C. and preferably in excess of 1200° C. The oxidizing operation is preferably so controlled as to produce a gaseous product containing not more than about one percent of free oxygen. The solid iron oxide collects in the lower portion of the roasting chamber and is removed therefrom by means of the screw conveyor 16. The sulphur dioxide, together with the inert gases introduced into the roasting chamber with the air, passes through the conduit 23 to the distillation chamber 12. The gases entering the conduit 23 are cooled to the desired distillation temperature preferably between 500° C. and 900° C., by controlling or varying the insulation on the conduit 23, and they flow to the manifold 36 from where they enter the distillation chamber through the tuyères 37.

The sulphur laden gases from the upper portion of the reducing and distillation chamber are introduced into the dust collector 13 through the conduit 38 and flow through the dust collector to the outlet 41. During the course of the passage of the sulphur laden gases through the dust collector, substantially all dust particles are removed. The cleaned gases passing out of the dust collector through the conduit 41 enter the condenser 14 in which a temperature sufficiently low to effect condensation of the sulphur vapor contained in the gases is maintained through control of the steam pressure. A temperature of about 115° C. to 150° C. is preferably maintained in the condenser. Sulphur dioxide-bearing gases are conducted from the condenser through the outlet 47 to the electrical precipitator 8 in which entrained sulphur particles may be removed. Molten sulphur collected in the lower portion of the condenser is withdrawn through the outlet 46. Sulphur dioxide-bearing gases expelled from the precipitator may be treated in any suitable manner for the recovery of the sulphur dioxide or for the recovery in elemental form of the sulphur of the sulphur dioxide.

It is to be understood that the apparatus illustrated in the drawing is merely illustrative and is not intended to be restrictive of the invention in any respect.

We claim:

1. The method of producing elemental sulphur which comprises subjecting a porous charge of pyrites to the action of a hot sulphur dioxide-bearing gas to distill the volatile sulphur of the pyrites, grinding the residue of the distillation treatment, subjecting the ground residue of the distillation treatment to a suspension roasting operation to produce a gaseous product containing sulphur dioxide, and utilizing the gaseous product thus produced for the treatment of the pyrites.

2. The method of producing elemental sulphur which comprises subjecting a porous charge of pyrites to the action of a hot sulphur dioxide-bearing gas to distill the volatile sulphur of the pyrites, grinding the residue of the distillation treatment, subjecting the ground residue of the distillation treatment to a suspension roasting operation to produce a gaseous product containing sulphur dioxide at a temperature in excess of 1000° C., and utilizing the gaseous product thus produced for the treatment of the pyrites.

3. The method of producing elemental sulphur which comprises subjecting a porous charge of pyrites to the action of a hot sulphur dioxide-bearing gas to distill the volatile sulphur of the pyrites, grinding the residue of the distillation treatment, subjecting the ground residue of the distillation treatment to a suspension roasting operation to produce a gaseous product containing sulphur dioxide at a temperature in excess of 1200° C., and utilizing the gaseous product thus produced for the treatment of the pyrites.

4. Apparatus for use in the production of elemental sulphur comprising a suspension roasting chamber, a distillation chamber, means for maintaining a porous bed of pyrites in the distillation chamber, means for introducing an oxidizing gas into the roasting chamber to oxidize iron sulphide therein with the production of a gaseous product containing sulphur dioxide, means for introducing the gaseous product formed in the roasting chamber into heat-exchange relation with the pyrites in the distillation chamber to effect distillation of the volatile sulphur of pyrites therein with the production of a gaseous product containing elemental sulphur vapor and a solid product corresponding substantially to the monosulphide of iron, means for grinding the solid product formed in the distillation chamber, means for introducing the ground product into the roasting chamber, means for withdrawing gases from the distillation chamber, and means for recovering elemental sulphur from gases withdrawn from the distillation chamber.

5. The method of producing elemental sulphur which comprises passing a gaseous product containing sulphur dioxide in contact with pyrites to distill the volatile sulphur of the pyrites, grinding the residue of the distillation treatment, subjecting the ground residue of the distillation treatment to a suspension oxidizing operation to produce a gaseous product containing sulphur dioxide, and utilizing the resulting gaseous product for said distillation of the pyrites.

6. The method of producing elemental sulphur which comprises passing a gaseous product containing sulphur dioxide in contact with pyrites to distill the volatile sulphur of the pyrites, grinding the residue of the distillation treatment, and subjecting the ground residue of the distillation treatment to a suspension oxidizing operation to produce a gaseous product containing sulphur dioxide, and utilizing the resulting gaseous product for distillation of pyrites with resultant liberation of volatile sulphur therefrom.

7. The method of producing elemental sulphur which comprises subjecting a porous charge of pyrites and carbonaceous material to the action of a gaseous product containing sulphur dioxide at a temperature sufficiently high to effect reduction of the sulphur dioxide and distillation of the volatile sulphur of the pyrites, grinding the residue of the pyrites to a particle size suitable for a suspension roasting operation, subjecting the ground residue to the action of an oxidizing gas while in suspension in the oxidizing gas to produce a gaseous product containing sulphur dioxide, and utilizing the gaseous product of the oxidizing operation for the treatment of the porous charge of pyrites and carbonaceous material.

8. Apparatus for use in the production of elemental sulphur comprising a suspension roasting chamber, a reducing furnace, means for maintaining a porous bed of carbonaceous material and pyrites in the reducing furnace, means for introducing an oxidizing gas into the roasting chamber to effect oxidation of iron sulphide therein with the production of a gaseous product containing sulphur dioxide, means for introducing the gaseous product formed in the roasting chamber into the reducing furnace in contact with the carbonaceous material and pyrites therein to effect reduction of the sulphur dioxide of the gaseous product and distillation of the volatile sulphur of the pyrites with the production of a gaseous product containing elemental sulphur in vapor form and a solid product corresponding substantially to the monosulphide of iron, means for grinding the solid product formed in the reducing furnace, means for introducing the ground product into the roasting chamber, means for withdrawing gases from the roasting furnace, and means for recovering elemental sulphur from gases withdrawn from the reducing furnace.

9. The method of producing elemental sulphur which comprises subjecting a porous charge of pyrites and coke to the action of a gaseous product containing sulphur dioxide to effect reduction of the sulphur dioxide and distillation of the volatile sulphur of the pyrites, grinding the residue of the pyrites to a particle size suitable for a suspension roasting operation, subjecting the ground residue to a suspension oxidizing operation at a temperature exceeding 1000° C. to produce a gaseous product containing sulphur dioxide, and utilizing the gaseous product from the oxidizing operation for the treatment of the porous charge of pyrites and coke.

RAYMOND F. BACON.
WILBER JUDSON.